United States Patent
Kamiya

(10) Patent No.: US 8,339,091 B2
(45) Date of Patent: Dec. 25, 2012

(54) COMMUNICATION APPARATUS FOR ROBOTS

(75) Inventor: Koji Kamiya, Anjo (JP)

(73) Assignee: Denso Wave Incorporated, Tokyo (JP)

( * ) Notice: Subject to any disclaimer, the term of this patent is extended or adjusted under 35 U.S.C. 154(b) by 1149 days.

(21) Appl. No.: 12/219,109

(22) Filed: Jul. 16, 2008

(65) Prior Publication Data

US 2009/0021391 A1     Jan. 22, 2009

(30) Foreign Application Priority Data

Jul. 17, 2007     (JP) .................................. 2007-185616

(51) Int. Cl.
    *G05B 19/04* (2006.01)
(52) U.S. Cl. .................................................. 318/568.2
(58) Field of Classification Search .................. 700/245;
    340/12.22, 3.1; 318/568.12, 568.11, 568.2
    See application file for complete search history.

(56) References Cited

U.S. PATENT DOCUMENTS

| | | | |
|---|---|---|---|
| 6,556,892 B2 * | 4/2003 | Kuroki et al. ................. | 700/245 |
| 2007/0120516 A1 | 5/2007 | Kurakake et al. | |

FOREIGN PATENT DOCUMENTS

| | | |
|---|---|---|
| JP | A-08-019985 | 1/1996 |
| JP | A-2001-222308 | 8/2001 |
| JP | A-2002-366210 | 12/2002 |
| JP | A-2007-156510 | 6/2007 |

OTHER PUBLICATIONS

Japanese Office Action issued Dec. 9, 2011 in Japanese Patent Application No. 2007-185616 (with translation).

* cited by examiner

*Primary Examiner* — Vernal Brown
(74) *Attorney, Agent, or Firm* — Oliff & Berridge, PLC

(57) ABSTRACT

A communication apparatus for robots is provided. A controller and drivers controlling each joint are serially connected to a serial transmission line. A final driver positioned at the last stage, among the drivers, is connected to an I/O module connected to a driver of a hand. When control signals for each driver and the driver of the hand are serially transmitted from the controller to the serial transmission line, the driver connected to the I/O module receives a control signal for the driver itself and a control signal for the driver of the hand, among the serially transmitted control signals, and transmits the control signal for the driver of the hand to the I/O module.

5 Claims, 11 Drawing Sheets

| ID NUMBER | 1 | 2 | ..... | 4 | ..... | n(6) |
|---|---|---|---|---|---|---|
| AXIS NUMBER | 1 | 2 | ..... | 4 | ..... | n(6) |

| ID NUMBER | 1 | 2 | ⋯⋯ | n | ⋯⋯ | 5 |
|---|---|---|---|---|---|---|
| AXIS NUMBER | 1 | 2 | ⋯⋯ | 5 | ⋯⋯ | n |

COMMUNICATION APPARATUS FOR ROBOTS

CROSS REFERENCES TO RELATED APPLICATION

The present application relates to and Incorporates by reference Japanese Patent application No. 2007-185616 filed on Jul. 17, 2007.

BACKGROUND OF THE INVENTION

1. Technical Field

The present invention relates to a communication apparatus for used in an articulated robot and In particular, to a communication apparatus that uses a serial transmission line to transmit control signals necessary for controlling movements of the robotic apparatus.

2. Related Art

Articulated robots have now been used in many fields including various factories. In most cases, an articulate robot is provided with a robot main body including servo motors serving as a drive source of each joint and drivers serving as joint control devices. The drivers are used to drive the servo motors. Each joint control device is connected to a controller arranged outside of the robot main body via a signal line. A control signal is provided to each joint control device from the controller.

In a robot main body such as this, when each joint control device and the controller are separately connected by signal lines, a number of signal lines passing through the robot main body increases significantly. Therefore, the controller and each joint control device are connected by a serial transmission line. Control signals are transmitted from the controller to each joint control device through specification of an address (identification [ID]).

Although the invention is not a robotic apparatus, a numerically controlled machine tool disclosed in Japanese Patent Laid-open Publication No. 2001-222308 has an NC unit, a plurality of controlling sections, a remote Input/output (I/O), and an operating board connected by a serial transmission line. The NC unit transmits data. The controlling sections control a plurality of servo motors and a main axis motor. The remote I/O inputs and outputs data into and from the NC unit.

A hand is attached to a tip section of the robot main body. The hand grips (clamps) a workpiece and releases (unclamps) the grip by a drive source, such as a pneumatic cylinder. The controller also provides a control signal to a controlling section (hand control device) that controls the drive source of the hand. Gripping and releasing of the work is performed at appropriate timings.

However, the type of hand and the drive source to be used for the hand are selected by a user depending on the work. Therefore, at shipment of the robotic apparatus, the hand control device is not yet attached to the robot main body. Thus, a separate signal line for the hand control device is laid out in the robot main body, and the user connects the signal line for the hand and the hand control device.

However, in the above-described conventional configuration, in addition to the signal lines for the plurality of joint control devices, a dedicated signal line for the hand control device is required. Further reduction of the number of signal lines is difficult.

SUMMARY OF THE INVENTION

The present invention has been achieved in light of the above-described issues. An object of the present invention is to provide a communication apparatus for a robot, which communication apparatus can reduce the number of signal lines connecting a controller, a plurality of joint control devices, and a hand control device.

According to one first aspect of the present invention, there is provided a communication apparatus for a robot provided with an articulated arm including a plurality of joints driven by a plurality of first drive sources controlled by respective joint control devices and a hand driven by a second drive source controlled by a hand control device, the joint control devices and the hand control device all responding to control signals from a controller to control movements of the robot. The communication apparatus comprises: a serial transmission path connecting the controller and the joint control devices so that signals including the control signals are communicated in series through the transmission path; an input and output device communicably connected to the hand control device and communicably connected to a joint control device specified among the joint control devices; transmission means, implemented in the controller, for transmitting the control signals in series to the serial transmission path; first communication means, implemented in each of one or more joint control devices other than the specified joint control device in the joint control devices, for communicating information including, of the control signals, a control signal assigned to each of the one or more joint control devices, between each of the one or more control devices other than the specified control device and the controller via the serial transmission path; and second communication means, implemented in the specified joint control device, for communicating information including, of the control signals, a control signal assigned to the specified joint control device and a control signal assigned to the hand control device, between the specified joint control and the controller via the serial transmission path.

Preferably, the first communication means includes first control signal reception means, implemented in each of the one or more joint control devices other than the specified joint control device in the joint control devices, for receiving the control signal assigned to each of the one or more joint control devices, and the second communication means includes second control signal reception means, implemented in the specified joint control device, for receiving not only the control signal assigned to the specified joint control device but also the control signal assigned to the hand control device; and control signal transmission means, implemented in the specified joint control device, for transmitting to the input and output device the received control signal assigned to the hand control device.

In this way, when control signals for the joint control devices and the hand control device are serially transmitted from the controller to the serial transmission line, the joint control device connected to the input and output device receives a control signal for the joint control device itself and a control signal for the hand control device, from among the serially transmitted control signals, and transmits the control signal for the hand control device to the input and output device. Therefore, a dedicated signal line for the hand control device is not required to be provided.

It is also preferred that the first communication means includes feedback signal transmission means for transmitting, via the serial transmission path, to the controller, a feedback signal picked up at each of the first drive sources, and the second communication means includes feedback signal transmission means for transmitting, via the serial transmission path, to the controller, both a feedback signal picked up at the specified drive source and a feedback signal picked up at the hand control device, all the feedback signals from the first and second drive sources indicating the movements of the robot.

According to this configuration, the joint control device connected to the input and output device transmits a feedback signal from a drive source controlled by the joint control device itself to the controller via the serial transmission line and a feedback signal from the hand control device provided to the input and output device to the controller via the serial transmission line. Therefore, the feedback signal from the hand control device can be transmitted to the controller without a separate signal line being provided.

DETAILED DESCRIPTION OF THE PREFERRED EMBODIMENTS

An embodiment of the present invention will now be described below with reference to FIG. 1 to FIG. 12.

Figure 1:
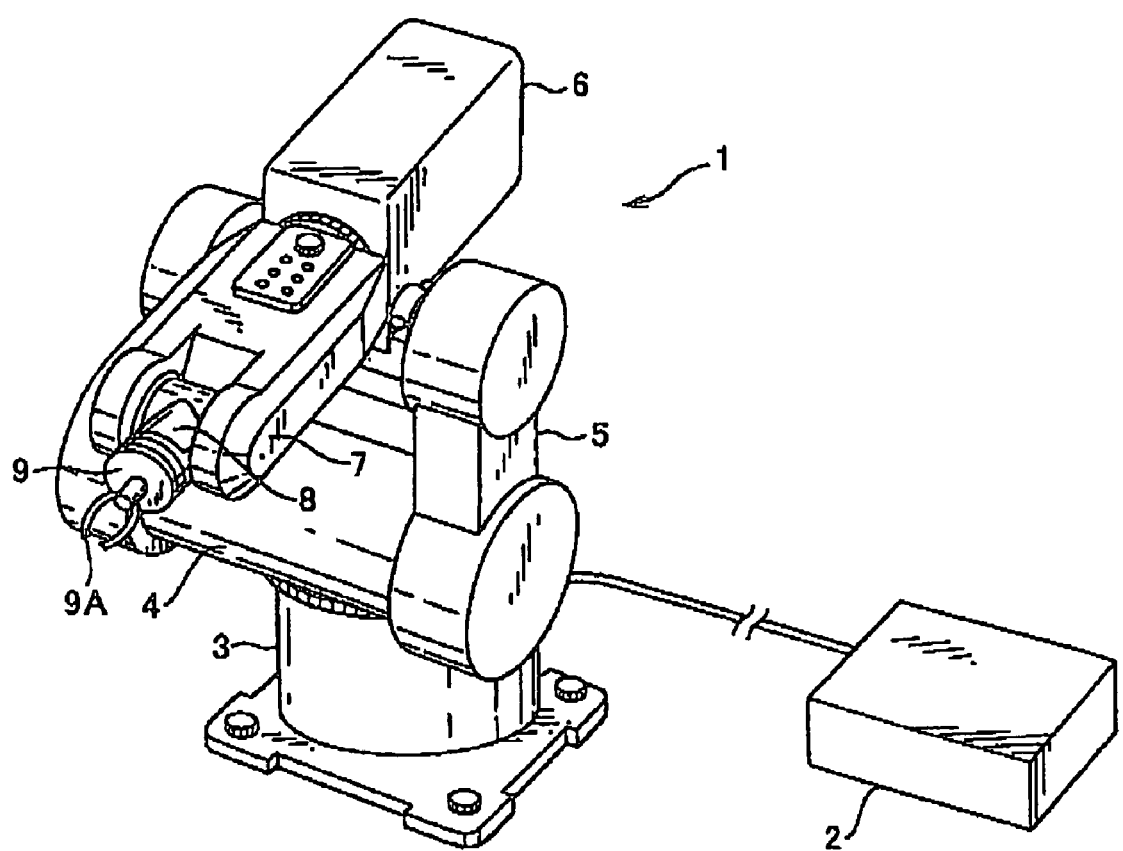
FIG. 1 is a perspective view of an articulated robot according to an embodiment of the present invention.

FIG. 1 shows a robotic apparatus (or simply called a robot or a robotic system), in which the communication apparatus according to the invention is implemented.

As shown in FIG. 1, the robotic apparatus includes a robot main body 1 as a main body and a controller 2 that controls movements of the robot main body 1. The robot main body 1 is a vertical articulated robot with six axes. The robot main body 1 includes a base 3, a shoulder section 4, a lower arm 5, a first upper arm 6, a second upper arm 7, a wrist 8, and a flange 9. The base 3 is fixed onto a floor. The shoulder section 4 is supported by the base 3 to allow turning in a horizontal direction. The lower arm 5 is supported by the shoulder section 4 to allow turning in a vertical direction. The first upper arm 6 is supported by the lower arm 5 to allow turning in the vertical direction. The second upper arm 7 is supported by a tip section of the first upper arm 6 to allow torsional rotation. The wrist 8 is supported by the second upper arm 7 to allow rotation in the vertical direction. The flange 9 is supported by the wrist 8 to allow rotation (torsional movement).

In addition to the base 3, the shoulder section 4, the lower arm 5, the first upper arm 6, the second upper arm 7, the wrist 8, and the flange 9 function as links in a robot. Among each link 3 to 9, joint axes used to move links 4 to 9 are driven by servo motors 10 to 15 (see FIG. 2) that are respective drive sources. The servo motors 10 to 15 are each provided in a link that is one level before a link to be driven. In other words, a servo motor 10 that drives the shoulder section 4 is provided in the base 3. A servo motor 11 that drives the lower arm 5 is provided in the shoulder section 4. A servo motor 12 that drives the first upper arm 6 is provided in the lower arm 5. A servo motor 13 that drives the second upper arm 7 is provided in the first upper arm 6. A servo motor 14 that drives the wrist 8 is provided in the second upper arm 7. A servo motor 15 that drives the flange 9 is provided in the wrist 8.

A hand 9A that grips a work is attached to the flange 9 that is a link at the tip. For example, a pneumatic cylinder 16 (see FIG. 4) serves as a drive source of the hand 9A. The hand 9A is configured to perform a movement to grip the work and release the grip by the pneumatic cylinder 16.

Figure 3:
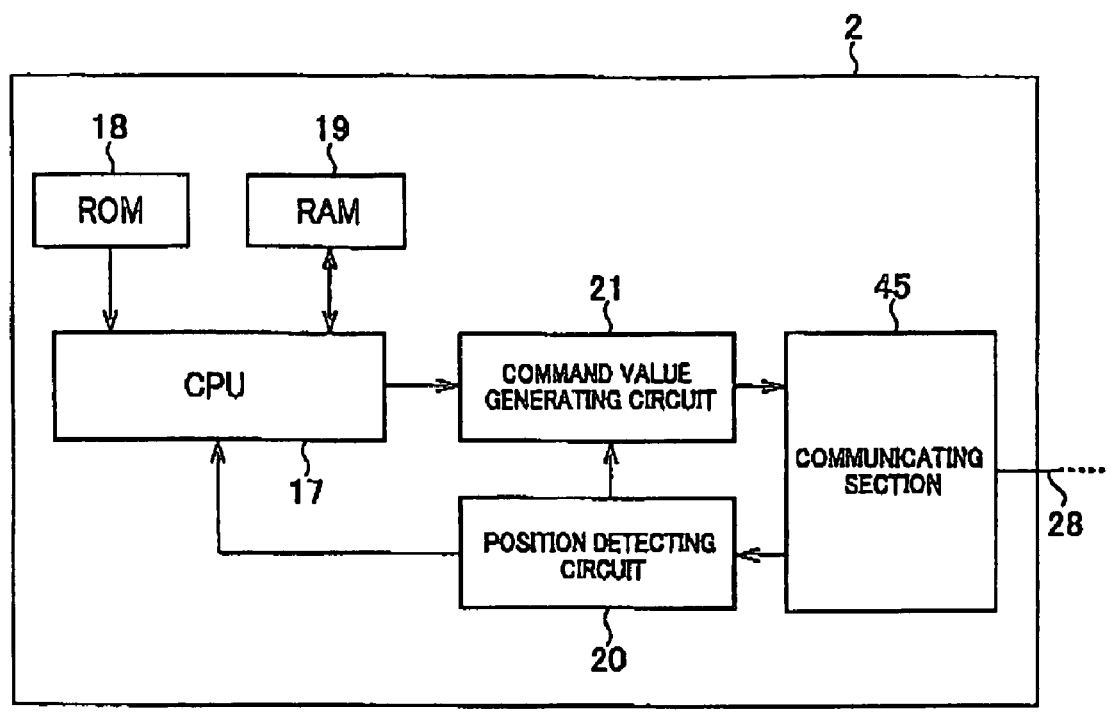
FIG. 3 is a block diagram of an internal configuration of the controller.

As shown in FIG. 3, the controller 2 has a main body, which is a CPU 17 serving as a controlling means. The CPU 17 is connected to a read-only memory (ROM) 18, a random access memory (RAM) 19, a position detecting circuit 20, and a command value generating circuit 21. The ROM 18 stores a robot language and the like used to generate a system program and an operation program for the robotic apparatus. The RAM 19 stores an operation program and the like for the robot main body 1. The position detecting circuit 20 serves as a position detecting means for the servo motors 10 to 15. The command value generating circuit 21 generates command values used to drive each servo motor 10 to 15.

In addition, drivers (joint control devices) 22 to 27 (see FIG. 2) used to drive the servo motors 10 to 15 are disposed in each link 3 to 8 respectively provided with the servo motors 10 to 15. Each driver 22 to 27 is connected to the controller 2 by a serial transmission line 28, as described hereafter. Thus the drivers 22 to 27 are in charge of driving the shoulder section 4, the lower arm 5, the first upper arm 6, the second upper arm 7, the wrist 8, and the flange 9, respectively.

The drivers 22 to 27 receive control signals (command values) from the controller 2 and drive respective servo motors 10 to 15. Rotary encoders 19 to 34 (see FIG. 2) serving as a rotation detecting means are connected to each servo motor 10 to 15. A detection signal (feedback signal) from each rotary encoder 29 to 34 is sent to respective drivers 22 to 27 and further transmitted from each driver 22 to 27 to the controller 2 via the serial transmission line 28.

The position detecting circuit 20 of the controller 2 detects a current position of each servo motor 10 to 15 based on the detection signals (feedback signals) from respective rotary encoders 29 to 34. The position detection Information is provided to the CPU 17 and the command value generating circuit 21. The CPU 17 calculates a next position taken after an elapse of a predetermined short period of time, based on the current position of each servo motor 10 to 15 provided by the position detecting circuit 20 and a speed pattern of each servo motor 10 to 15 set in advance. The CPU 17 provides the command value generating circuit 21 with the next position Information. The command value generating circuit 21 then compares the current position information of each servo motor 10 to 15 provided by the position detecting circuit 20 and the next position information of each servo motor 10 to 15 provided by the CPU 17 and, based on the difference, generates a command value for each servo motor 10 to 15. The command value generating circuit 21 sends the generated command values to respective driver 22 to 27.

The CPU 17 also detects a hand gripping period or a grip releasing period based on the current position Information of each servo motor 10 to 15 and provides the command value generating circuit 21 with a grip timing signal or a grip release timing signal. The command value generating circuit 21 sends a grip command and a grip release command serving as hand commands to a driver 35 (see FIG. 4) of the pneumatic cylinder 16, serving as a hand control device, based on the provided grip timing signal and the grip release timing signal. The driver 35 turns ON or OFF a path switching valve 36 for compressed air, based on the grip command and the grip release command and makes the pneumatic cylinder 16 perform an advancing movement and a retreating movement. The hand 9A is configured to perform a gripping movement and a grip releasing movement as a result of the advancing and retreating movements of the pneumatic cylinder 16.

According to the embodiment, a disposal position of the driver 35 in the pneumatic cylinder 16 is within the wrist 8 because the wrist 8 is the link closest to the hand 9A. An I/O module (input and output device) 37 is connected to the driver 27 of the driving servo motor 15 of the flange 9 disposed within the wrist 8. The driver 27 of the driving servo motor 15 of the flange 9 receives the hand command outputted from the command value generating circuit 21 of the controller 2 and provides the driver 35 with the hand command via the I/O module 37.

Figure 4:
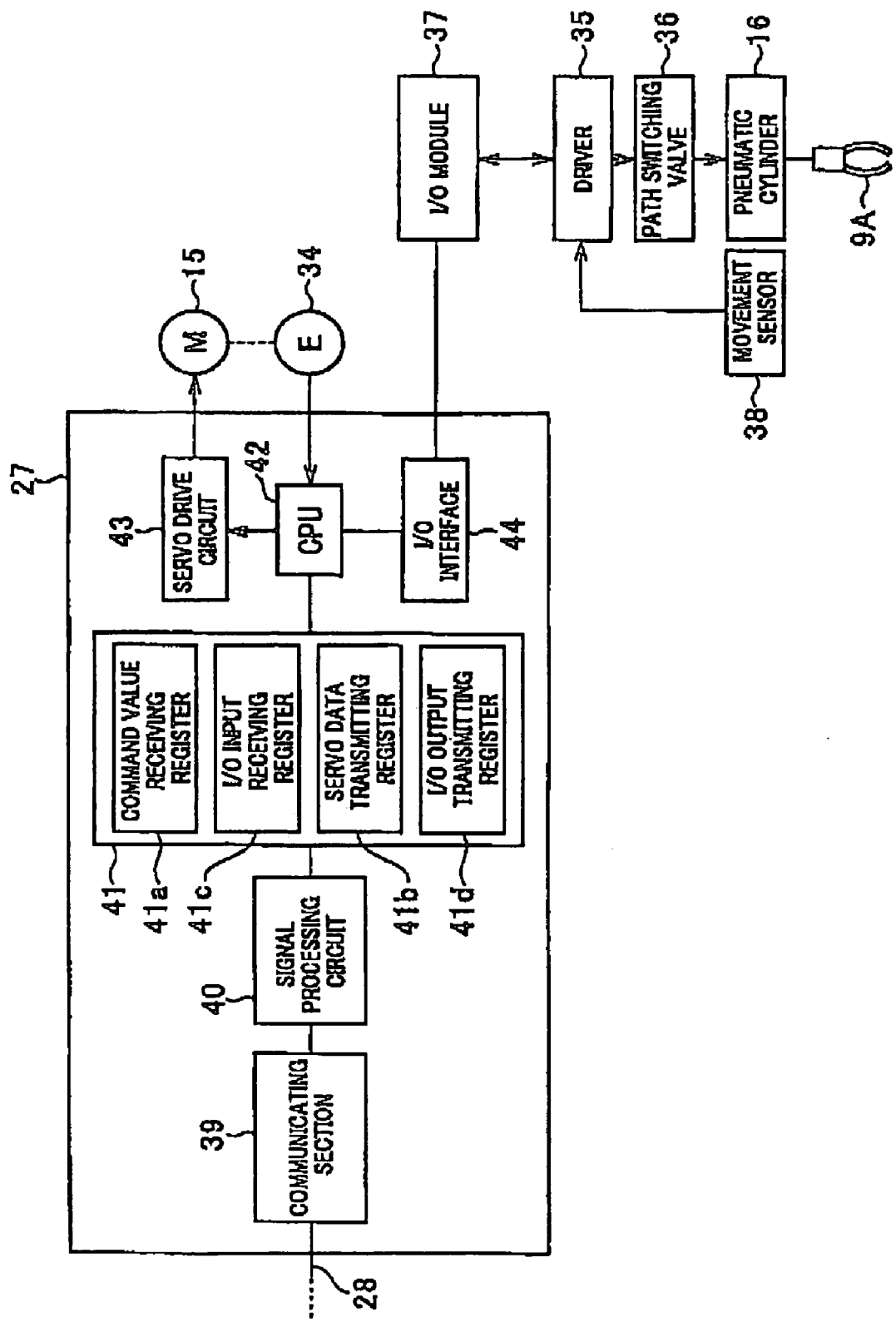
FIG. 4 is a block diagram of an Internal configuration of a driver to which an I/O module is connected.

As shown in FIG. 4, the hand 9A is provided with a movement sensor 38 that is composed of, for example, a microswitch used to detect whether the hand 9A is in a gripping state or a grip released state. A detection signal (ON and OFF signal) from the movement sensor 38 is provided to the driver 35, then from the driver 35 to the I/O module 37. The detection signal is further provided from the I/O module 37 to the driver 27 of the driving servo motor 15 of the flange 9.

Figure 5:
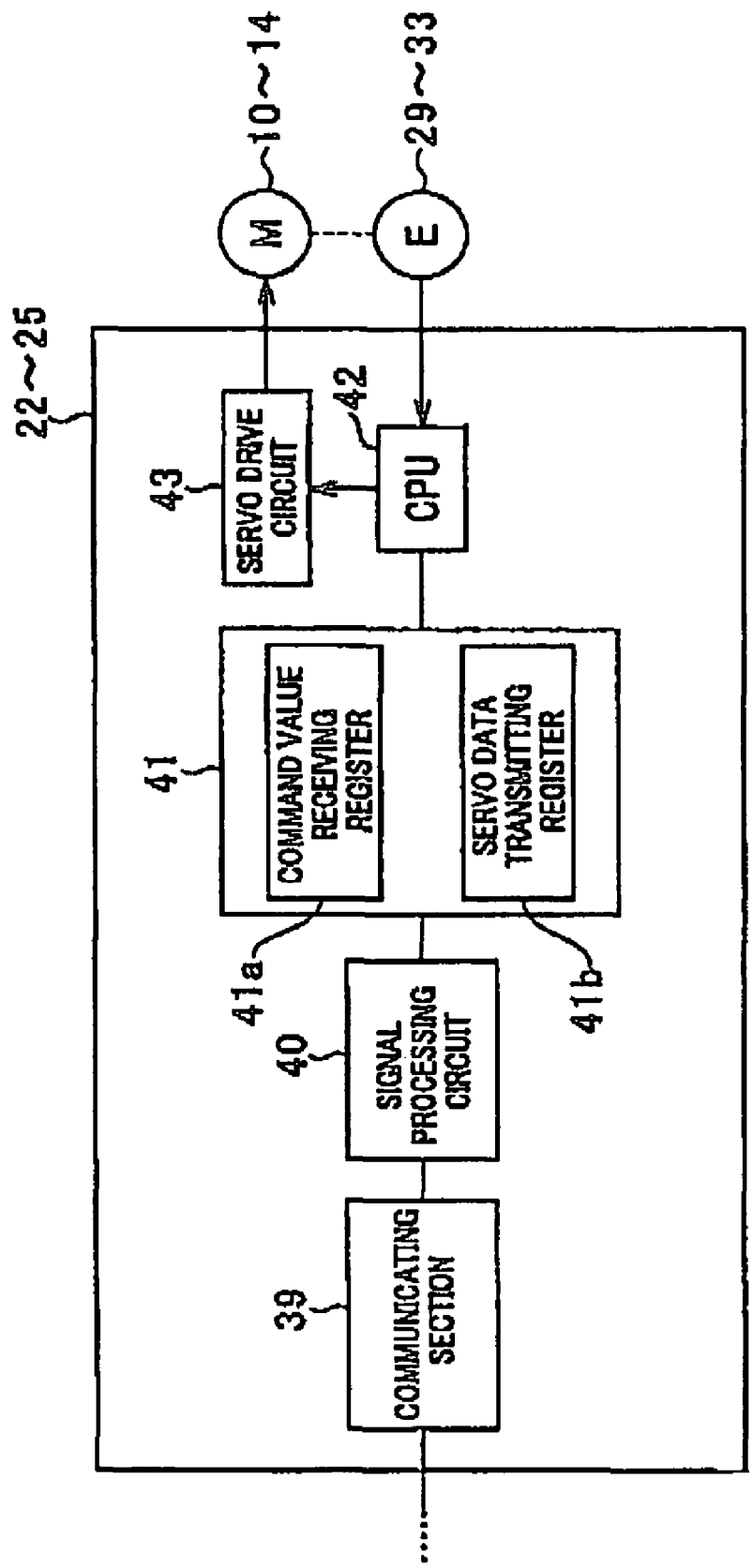
FIG. 5 is a block diagram of an internal configuration of another driver.

Further, signal transmission and reception configurations of the controller 2 and each driver 22 to 27 will be described. First, among the respective drivers 22 to 27 of each servo motor 10 to 15, configurations of the drivers 22 to 26 excluding the driver 27 connected to the I/O module 37 are shown in a block diagram in FIG. 4. As shown in FIG. 5, the drivers 22 to 26 include a communicating section 39, a signal processing circuit 40, a register section (storage means) 41, a CPU 42, and a servo drive circuit 43.

The signal processing circuit 40 demodulates the signal received from the controller 2 and stores the demodulated signal in a command value receiving register 41a in the register section 41. The CPU 42 obtains a command value from the command receiving register 41a and provides the servo drive circuit 43 with the command value. The servo drive circuit 43 drives the servo motors 10 to 14 based on the command value. The CPU 42 that has received the detection signal from the rotary encoders 29 to 33 stores the detection signal in a servo data transmitting register 41b in the register section 41. The signal processing circuit 40 obtains the detection signal of the rotary encoders 29 to 33 from the servo data transmitting register 41b and modulates the detection signal. The signal processing circuit 40 then transmits the modulated signal from the communicating section 39 to the controller 2.

The remaining driver 27 has the same configuration as the above-described drivers 22 to 26, aside from the register section 41 also including an I/O output receiving register 41c and an I/O transmitting register 41d in addition to the driver 27 including an I/O Interface 44 connected to the I/O module 37. The I/O output receiving register 41c stores a hand grip command signal from the controller 2. The I/O transmitting register 41d stores the detection signal from the hand movement sensor 38 sent from the I/O module 37 to the I/O interface 44.

The controller 2 is also provided with a communicating section (communication means) 4S. The communicating section 45 is connected to the position detecting circuit 20 and the command value generating circuit 21 of the controller 2, in addition to the serial transmission line 28. The communicating section 45 modulates the signal sent from the command value generating circuit 21 and transmits the modulated signal to the serial transmission line 28. The communicating section 45 also demodulates the signal sent from the serial transmission line 28 and provides the position detecting circuit 20 with the demodulated signal.

Figure 2:
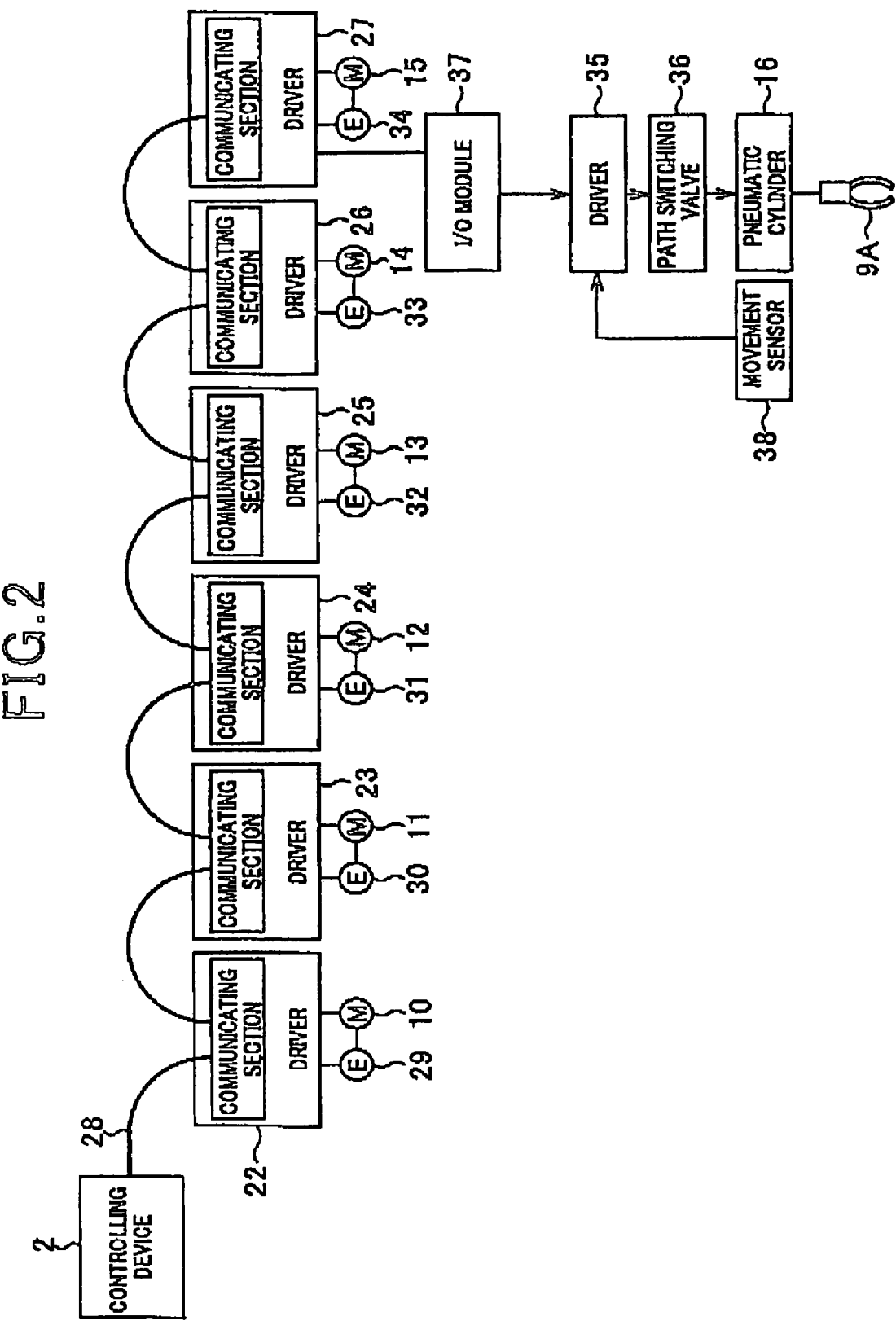
FIG. 2 is a wiring diagram of a data transmission line between a controller and each driver according to a first embodiment of the present invention.

The above-described drivers 22 to 27 of each servo motor 10 to 14 are serially connected on the serial transmission line 28, as shown In FIG. 2. An ID number (address) used for communication is prescribed to the respective drivers 22 to 27 of each servo motor 10 to 15. On the other hand, when generating the next position information of the servo motors 10 to 15, the CPU 17 of the controller 2 generates the next position information in correlation with a number of the joint axis driven by each servo motor 10 to 15.

For example, the ROM (storage means) 18 stores data correlating the ID numbers of the drivers 22 to 27 and the numbers of the joint axis driven by the servo motors 10 to 15 respectively controlled by the driver 22 to 27. The CPU 17 correlates the next position information of each servo motor 10 to 15 with the ID number of each driver 22 to 27 to which the information is to be transmitted and sends the correlated Information to the command value generating circuit 21. The command values for the servo motors 10 to 15 respectively controlled by the drivers 22 to 27 can be accurately transmitted to each driver 22 to 27. The correlation data of the ID number of each driver 22 to 27 and the number of the joint axis to be respectively driven by the servo motors 10 to 15 respectively controlled by the drivers 22 to 27 is shown in FIG. 6.

The command values and the hand commands generated by the command value generating circuit 21 are sent to the communicating section 45 and then sent to the serial transmission line 28 as serial control signals. The serial transmission line 28 is a path which is able to serially transmit a plurality of sets of data to a plurality of objects.

Figures 6, 7:
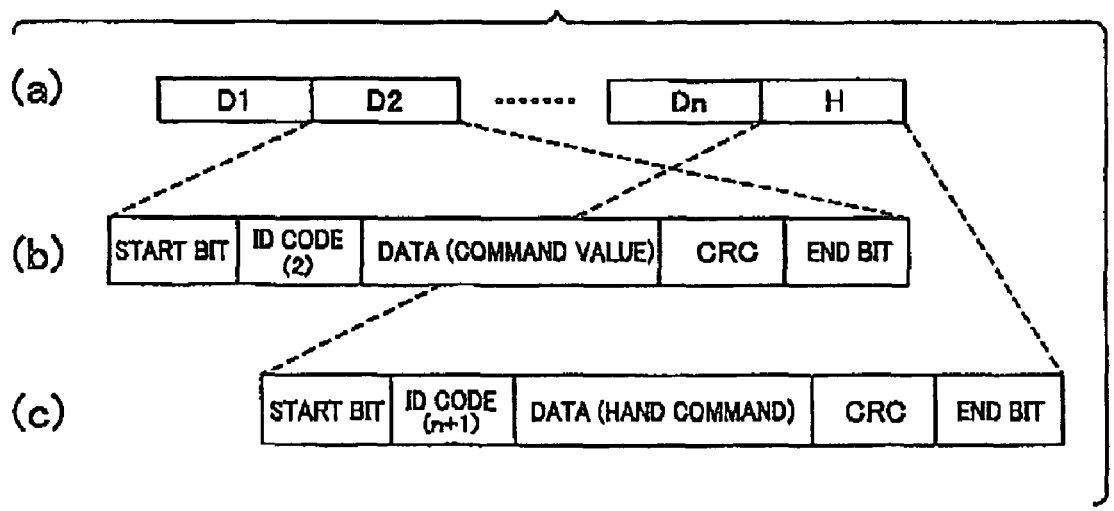
FIG. 6 is a diagram of conversion data of ID numbers and joint axis numbers.
FIG. 7 is a diagram of a format of transmission data from the controller.

A format of a serial control signal is shown in FIG. 7. First, FIG. 7(a) shows serial data transmitted from the communicating section 45. Transmission data (control signals) D1, D2, . . . Dn to each driver 22 to 27 controlling respective servo motors 10 to 15 and transmission data (control signal) H to the driver 35 of the hand 9A are consecutively transmitted in series. n indicates a maximum value of the number of the joint axis. According to the embodiment, because the I/O module 37 is connected to the driver 27 of the servo motor 15 of the joint axis (number 6) of the last level, the ID number n is the same number as the maximum number of the joint axis, "6".

FIG. 7(b) shows a transmission format of the transmission data D1, D2, . . . D6 (=Dn) to each driver 22 to 27. Each piece of transmission data D1 to D6 includes a start bit, an ID number, a command value, a CRC (error-detecting code), and an end bit.

FIG. 7(c) shows a transmission format of the transmission data H to the driver 35 of the hand 9A. The transmission data H includes a start bit, an ID number (n+1), a hand command (ON command indicating gripping or OFF command indicating grip release), a CRC (error-detecting code), and an end bit. According to the embodiment, the ID number of the driver 35 of the hand 9A is "7(=n+1)".

Regarding the transmission data D1 to D6 and H transmitted over the serial transmission line 28, each driver 22 to 27 is configured to receive only the transmission data having the ID number of the driver itself and does not receive other data. However, the driver 27 for driving a sixth axis connected to the I/O module 37 and having the ID number "6 (=n)", is configured to also receive the data having the ID number that is the ID number of the driver itself plus one, in addition to the transmission data to which the ID number of the driver itself, "6", is attached. In other words, the driver 27 also receives the transmission data H of the hand command.

An operation performed when the command value is transmitted from the controller 2 to each driver 22 to 27 will now be described with reference to flowcharts in FIG. 9 to FIG. 12.

The position detecting circuit 20, the command value generating circuit 21, and the communicating section 45 function under the control of the CPU 17. Therefore, in the description below, operations individually performed by the position detecting circuit 20, the command value generating circuit 21, and the communicating section 45 are also described as operations-performed by the controller 2.

When the controller 2 obtains the current position Information of each servo motor 10 to 15, the controller 2 first sets a joint axis number m to 1 and calculates the next command position in sequence from the first axis, based on the current command position information of each servo motor 10 to 15 and the speed pattern information (Steps S1 to S6). Then, the controller 2 calculates the command value from the difference between the current position of the servo motors 10 to 15 and the next command position (Step S1 and Step S2 in FIG. 9). The controller 2 obtains the ID number that is transmission destination data from the correlation data of the joint axis number and the ID number, and generates the transmission data that is a correlation of the command value and the ID number (Step S4).

When transmission data frames for the axes up to the sixth axis are generated (YES at Step S5), the controller 2 generates a transmission data frame for the driver 35 of the hand 9A having an ID number 7 (Step S7). Then, the controller 2 transmits the transmission data D1 to D6 of the command value for each axis and the transmission data H for the hand command, shown in FIG. 7, to the serial transmission line 28 as serial signals (Step S8 and Step S9).

When the serial data in FIG. 7 is transmitted to the serial transmission line 28, each driver 22 to 27 reads the transmission data having the same ID number as the ID number of the driver itself, from among the transmission data D1 to D6 and H. The drivers 22 to 27 drive respective servo motors 10 to 15 based on the command value.

Figure 11:
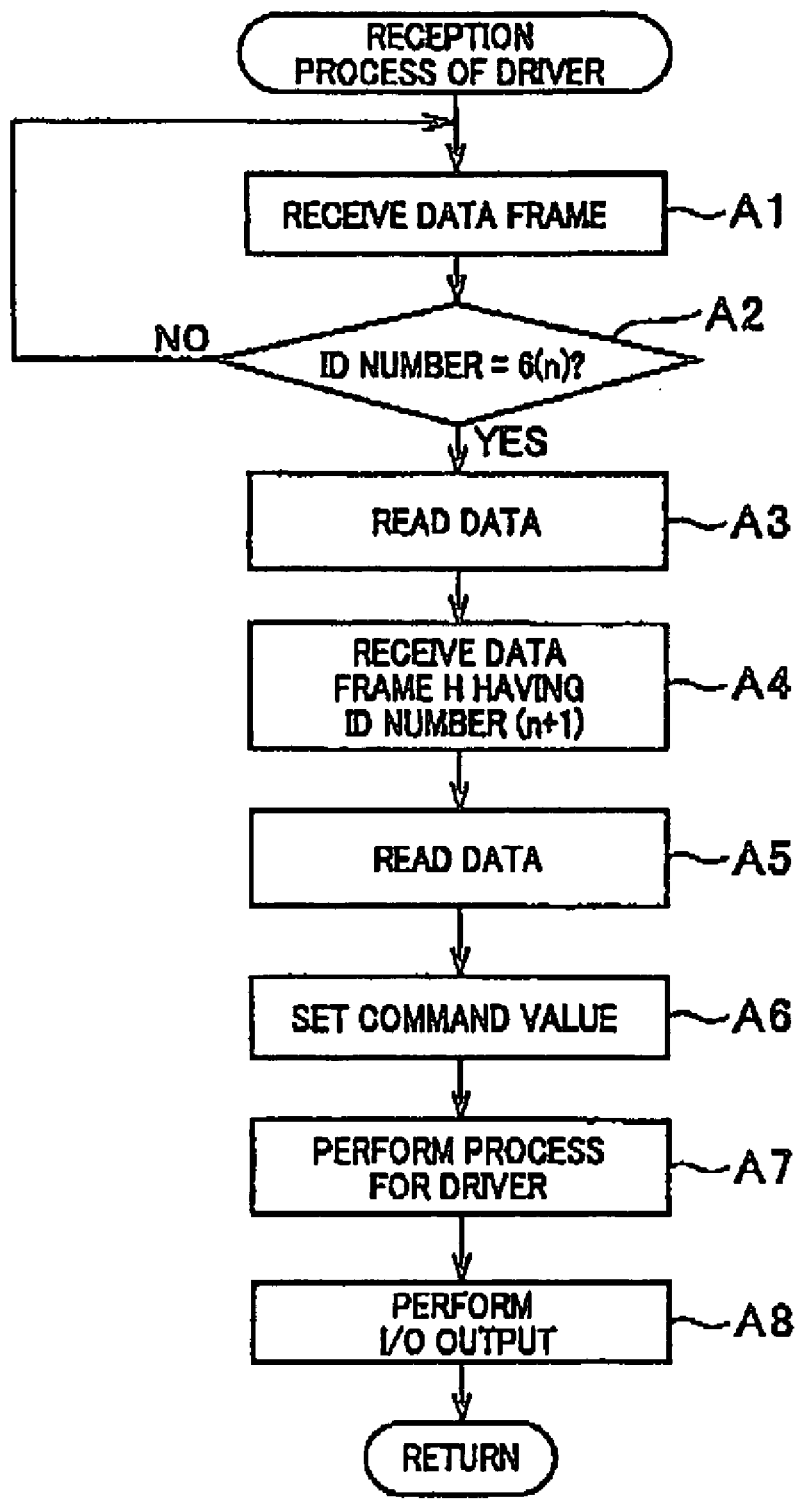
FIG. 11 is a flowchart of details of reception control of data by the driver.

A reception operation of the driver 27 connected to the I/O module 35 is shown in a flowchart in FIG. 11. When the driver 27 receives the transmission data frame having the same ID number 6 as the ID number of the driver itself in the same manner as the other drivers 22 to 26 (Step A1 and YES at Step A2), the driver 27 reads the transmission data (Step A3). Then, the driver 27 receives the transmission data frame having the ID number "7(=n+1)" and reads the data (Step A4 and Step A5).

Then, the command value of the transmission data D6 is stored in the command value receiving register 41a and the command value in the transmission data H is stored in the I/O receiving register 41c (Step A6). The CPU 42 then drive-controls the servo motor 15 via the servo driver circuit 43 based on the command value in the command value receiving register 41a (Step A7) and controls the switching valve 36 via the driver 35 based on the hand command in the I/O receiving register 41c, thereby operating the pneumatic cylinder 16 (Step A8). The current position of each servo motor 10 to 15 as a result of the control is detected by respective rotary encoders 29 to 34 and stored in the servo data transmitting register 41b. An operation result of the pneumatic cylinder 16 (whether in a gripping state or a grip released state) is detected by the movement sensor 38 and stored in the I/O input transmitting register 41d of the driver 27 as the feedback signal.

Figure 10:
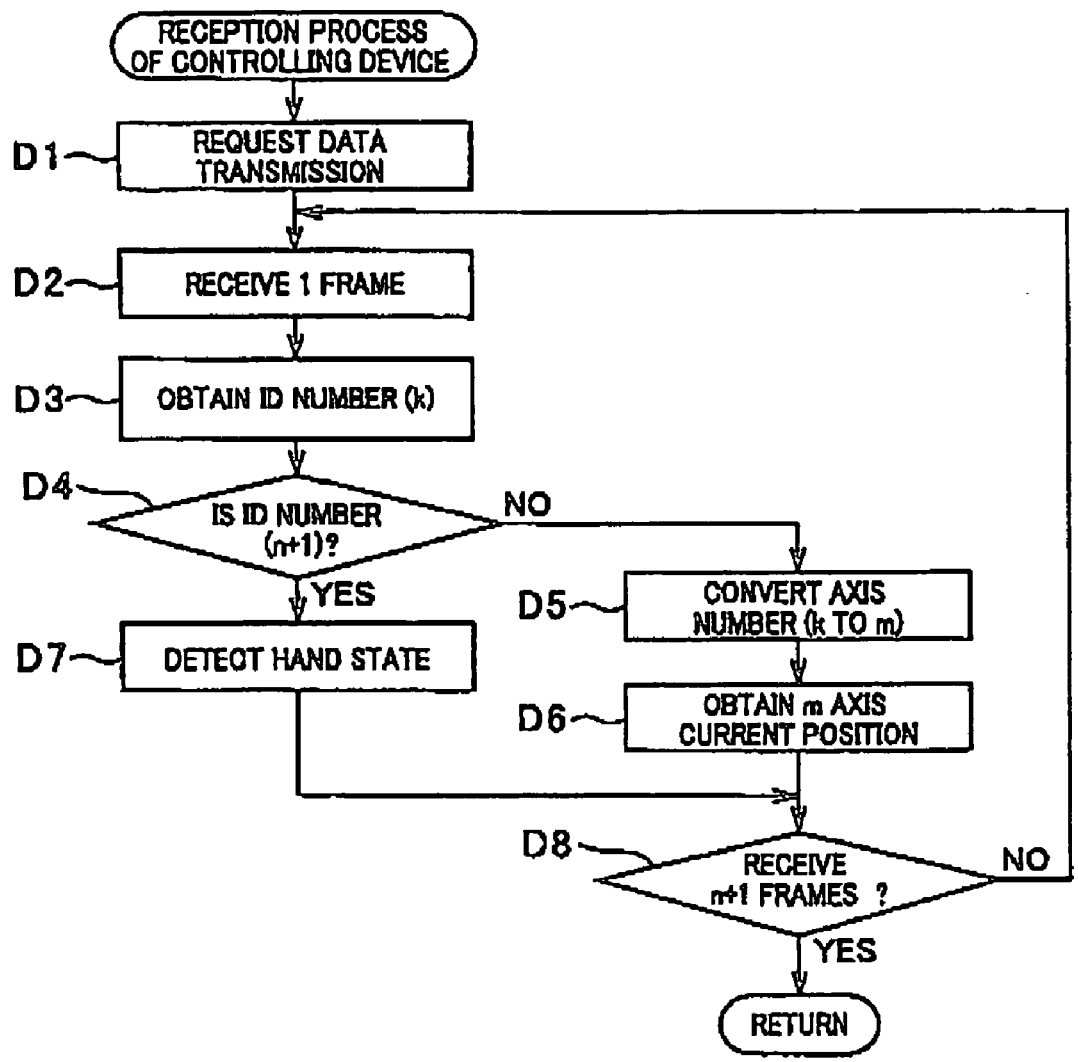
FIG. 10 is a flowchart of details of reception control of data by the controller.

When the controller 2 completes transmission of the transmission data D1 to D6 and H, as shown in FIG. 10, the controller 2 outputs a data transmission request signal for all drivers 22 to 27 to the serial transmission line 28 (Step D1). Upon receiving the data transmission request, each driver 22 to 27 transmits the current position information from the rotary encoders 29 to 24 stored in the servo motor transmitting register 41b from the communicating section 39 to the serial transmission line 28, via the signal processing circuit 40.

Figure 8:
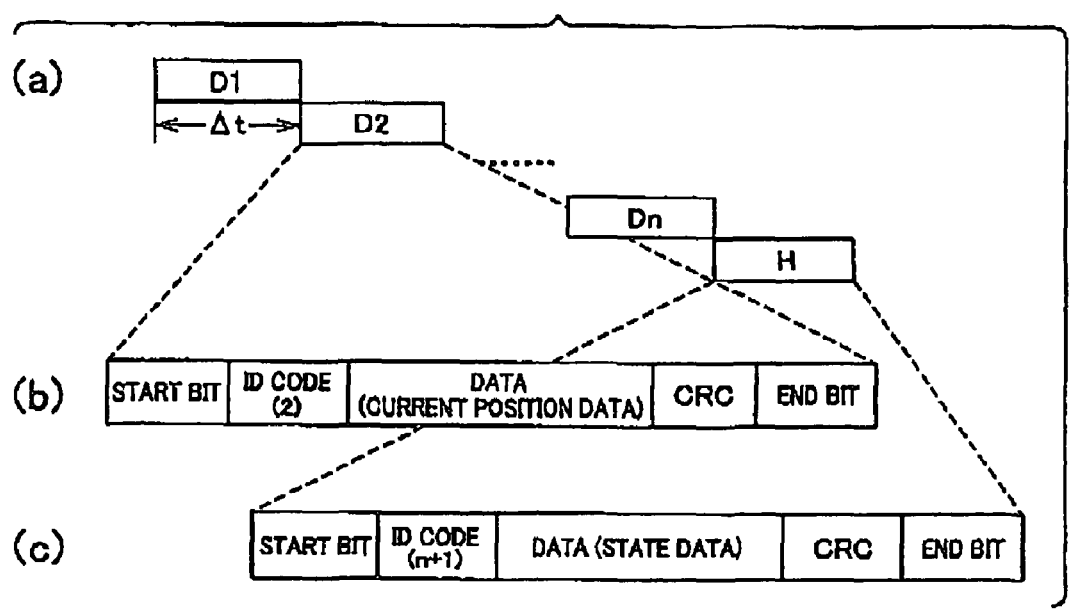
FIG. 8 is a diagram of a format of transmission data from the driver to the controller.
Figure 9:
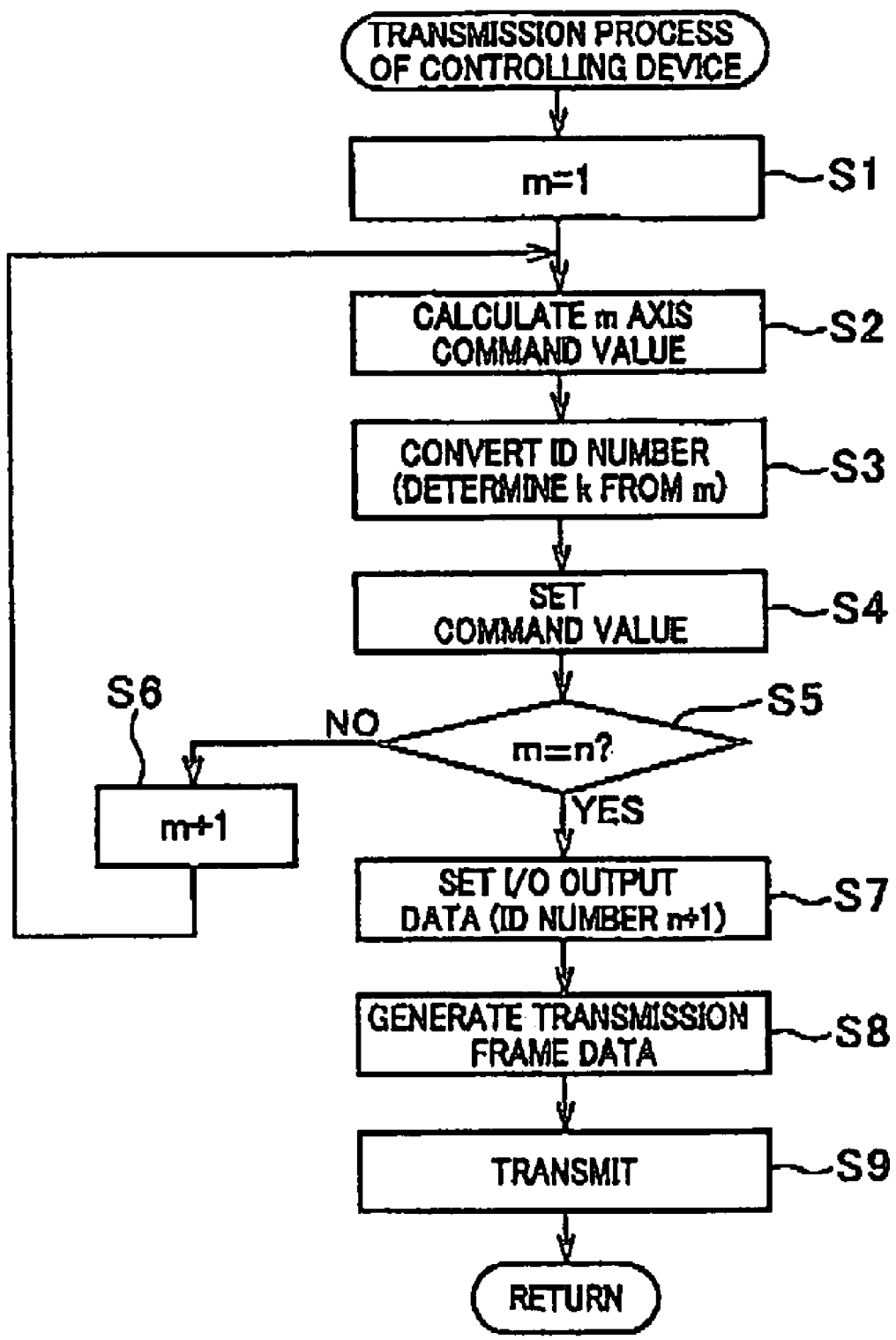
FIG. 9 is a flowchart of details of transmission control of data from the controller to the driver.

The format of the data transmitted from the drivers 22 to 27 to the serial transmission line 28 is shown in FIG. 8. In FIG. 8(a), the transmission data from each driver 22 to 27 is transmitted in sequence from that with the smallest ID number at a predetermined time interval Δt. In FIG. 8(b) the transmission data of the drivers 22 to 27 of each servo motor 10 to 15 includes a start bit, an ID code, current position data, a CRC, and an end bit. In FIG. 8(c), the transmission data from the driver 35 of the hand 9A includes a start bit, an ID code, state data, a CRC (cyclic redundancy check), and an end bit.

Figures 12, 13:
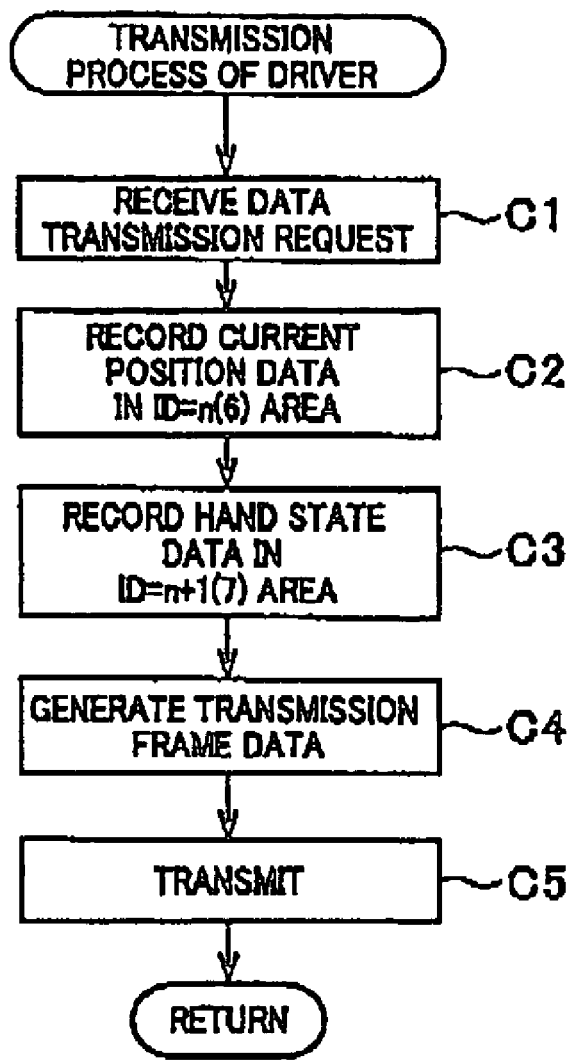
FIG. 12 is a flowchart of details of transmission control of data by the driver.
FIG. 13 is a diagram equivalent to FIG. 6 according to another embodiment of the present invention.

The transmission operation of the driver 27 to which the I/O module 37 is connected is shown in the flowchart in FIG. 12. Like the other drivers 22 to 26, when the driver 27 receives the transmission data request (Step C1), the driver 27 generates a data frame having the ID number n (=6). The driver 27 reads the current position information of the servo motor 15 from the servo data transmitting register 41c and writes the current position information in a data area (Step C2). Next, the driver 27 generates a data frame having the ID number n+1 (=7). The driver 27 reads the state Information of the movement sensor 38 stored in the I/O transmitting register 41d and writes the state information in the data area (Step C3). Then, the driver 27 generates a data frame that is a combination of the pieces of transmission data having the ID number n and the ID number n+1 (Step C4) and transmits the generated data frame to the serial transmission line 28 (Step C5).

When the controller 2 receives the data transmitted from the drivers 22 to 27 one frame at a time, the controller 2 obtains the ID number for each frame (Step D2) and obtains the ID number (Step D3). When the ID number is not n+1, namely the data is not the hand state data (NO at Step D4), the controller 2 decides the joint axis number from the ID number and obtains the current position information of the servo motor 10 to 15 driving the joint axis (Step D5 and Step D6). When the ID number is n+1, namely the data is the hand state data (YES at Step D4), the controller 2 obtains the hand state information (Step D5 and Step D6). When the operations described above are performed for the number of transmitted data frames ("7" according to the embodiment), the controller 2 completes the process for the transmission data from each driver 22 to 27 (YES at Step D8) and proceeds to the transmission process in FIG. 9.

In this way, according to the embodiment, the I/O module 37 is connected to the driver 27. An operation command to the driver 35 of the hand 9A has the same format as command value commands for the drivers 22 to 27 of the servo motors 10 to 15 and is sent to the driver 35 from the driver 27 via the I/O module 37. Therefore, a transmission line dedicated to the driver 35 of the hand 9A is not required to be provided. The number of signal lines passing through the robot main body 1 can be reduced.

The I/O module 37 is not provided in each driver 22 to 27, but only in the appropriate driver, the driver 27 according to the embodiment. Therefore, size increase of the drivers 22 to 26 can be prevented.

Moreover, because the I/O module 37 is provided in only the driver 27, regarding the transmission data transmitted from the controller 2, only a transmission signal for a single I/O module 37 is required to be added to the transmission data for each driver 22 to 27. Therefore, the amount of data transmitted in series can be reduced.

The present invention is not limited to the embodiment described above and shown in the drawings. Expansions and modifications such as that described below can be made.

The I/O module 37 is not limited to a configuration in which the I/O module 37 is connected to the driver 27 for the sixth axis. When the wrist 8 lacks space for disposing the I/O module 37 or depending on the configuration of the hand 9A, the I/O module 37 can be connected to the driver of another axis. In this case, the ID number of the driver to which the I/O module 37 is connected is preferably n. For example, when the I/O module 37 is connected to the driver 26 controlling the servo motor 14 for driving the wrist 8 provided in the second upper arm 7, the joint axis number of the driver 26 is 5 but the ID number is n(6) (see FIG. 13). As a result, a program used to actualize the operations in the flowcharts in FIG. 9 to FIG. 12 is not required to be changed.

Each driver 22 to 27 can be connected mutually parallel in relation to the serial transmission line.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore Intended to be embraced by the claims.

What is claimed is:

1. A robot comprising:
an articulated arm including a plurality of links movably joined respectively by a plurality of joints;
a plurality of first drive sources that drives the joints respectively;
a plurality of joint control devices that control drive operations of the plurality of first drive sources, respectively;
a hand driven by a second drive source;
a hand control device that controls drive operations of the second drive sources;
a controller that controls operations of the joints and the hand by providing the joint control devices and the hand control device with control signals;
a serial transmission path connecting the controller and the joint control devices so that signals including the control signals are communicated in series through the serial transmission path;
an input and output device communicably connected to the hand control device and communicably connected to a designated joint control device among the joint control devices;
command producing means, implemented in the controller, for producing the control signals including commands to drive the first and second drive sources, the control signals having a same format;
requesting means, implemented in the controller, for repeatedly issuing a request for position signals showing current operating positions of the first drive sources and the second drive source for producing the control signal;
transmission means, implemented in the controller, for repeatedly transmitting the control signals in series and the request for the position signals to the joint control devices through the serial transmission path;
reception means, implemented in the controller, for repeatedly receiving the position signals in series through the serial transmission path;
first communication means, implemented in each of remaining one or more joint control devices other than the designated joint control device in the joint control devices, for communicating the control signals and the position signals by receiving the control signals and transmitting the positions signals between each of the remaining one or more control devices and the controller via the serial transmission path; and
second communication means, implemented in the designated joint control device, for communicating the control signals and the position signals to the designated joint control device, the hand control device, and the controller by receiving the control signals and transmitting the positions signals, respectively, to and from both the designated joint control device and the hand control device the serial transmission path,
wherein the second communication means includes reception means for receiving the control signals directed to both the designated joint control device and the hand control device, providing means for providing the hand control device with a received control signal, detection means for detecting the position signal showing the current operating position of both the first drive source for the designated joint control device and the second drive source, and position-signal transmitting means for transmitting the detected position signals to the controller via the serial transmission path, the reception means and the providing means being operative in response to the reception of the control signal for the designated joint control device, the detection means and the position-signal transmitting means being operative in response to reception of the request from the controller.

2. The robot of claim 1, wherein the first drive sources are servo motors each provided with a rotary encoder to detect a current rotation position of each servo motor, the position signal being an output signal of each of the rotary encoders.

3. The robot of claim 1, wherein the designated joint control device is a joint control device assigned to a last link of the plurality of links of the articulated arm.

4. The robot of claim 1, wherein the last link is a flange of the articulated arm.

5. The robot of claim 1, wherein the designated joint control device is a joint control device assigned to a wrist that movably holds the flange, the wrist being one of the links.

* * * * *